Dec. 5, 1950    R. BROWN ET AL    2,532,356
LAWN SPRINKLER

Filed March 25, 1948    2 Sheets-Sheet 1

INVENTORS
ROBINSON BROWN
HUGH E. METCALF
BY *Toulmin & Toulmin*
ATTORNEYS

Dec. 5, 1950 R. BROWN ET AL 2,532,356
LAWN SPRINKLER
Filed March 25, 1948 2 Sheets-Sheet 2

INVENTORS
ROBINSON BROWN
HUGH E. METCALF
BY Toulmin & Toulmin
ATTORNEYS

Patented Dec. 5, 1950

2,532,356

UNITED STATES PATENT OFFICE 2,532,356

LAWN SPRINKLER

Robinson Brown and Hugh E. Metcalf, San Antonio, Tex., assignors to Institute of Industrial Research, San Antonio, Tex., a foundation of Texas Application March 25, 1948, Serial No. 16,908

8 Claims. (Cl. 299—18)

This invention relates to lawn sprinklers.

An object of the invention is to provide an improved and simplified lawn sprinkler in which control is provided over the arcuate coverage made by the water-spray.

It is convenient to be able to control the spread or coverage made by a sprinkler so that water will not be wasted in areas that do not need sprinkling. Thus, it is desirable to be able to control the spread of the water-spray over an arc of 90° up to full coverage of 360°.

It is therefore the object of this invention to provide a simplified device that will regulate the angle at which the water is discharged from the sprinkler.

Further objects and advantages will become apparent from the drawings and the following description.

Figure 1:
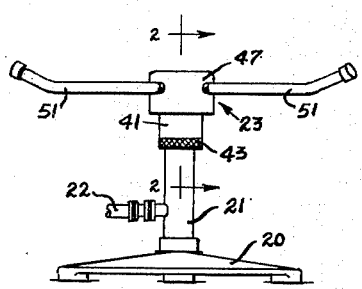
Figure 1 is a side elevational view of a lawn sprinkler incorporating the features of this invention.

In this invention the sprinkler consists of a base 20 having a vertical stand-pipe 21 which may have an inlet water connection 22. A spinner 23 is carried upon the vertical stand-pipe 21.

The vertical stand-pipe 21 may form the body for the sprinkler, or the body can be made a separate element attached to the stand-pipe. However, the same reference numeral can be used for this element.

The body 21 is provided with an axial chamber 25 into which water under pressure is delivered. This chamber 25 is provided with one large arcuate slot 26 and two smaller openings 27 and 28, which slot and openings are all at the same level in the body 21.

Figure 2:
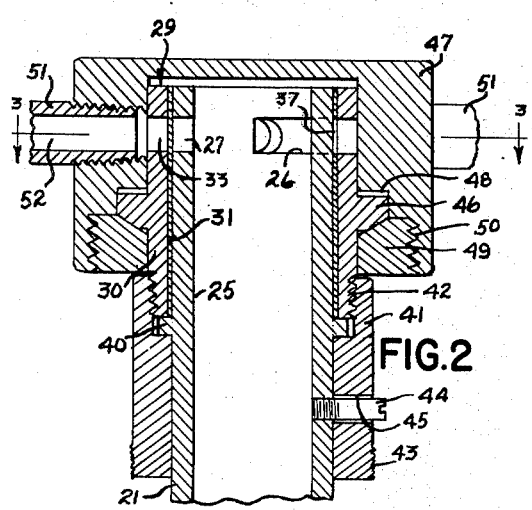
Figure 2 is a vertical cross-sectional view taken substantially along line 2—2 of Figure 1.

An annular sleeve valve 29 is composed of two parts consisting of a sleeve valve body 30 and an inner sleeve 31 that are secured together in any suitable manner. The sleeve valve body 29 has four elongated slots 32, 33, 34 and 35 all arranged at the same level in the sleeve valve body. When the sleeve valve is mounted upon the body 21 in the manner shown in Figure 2, the slots 32, 33, 34 and 35 are at the same level as the openings 26, 27, and 28 in the body 21.

The sleeve 31 is provided with two long slots 36 and 37, a somewhat shorter slot 38 and a still smaller opening 39, all of which are at the same level as the slots 32, 33, 34 and 35 in the sleeve valve body 30 and at the same level as the openings 26, 27 and 28 in the body 21.

The sleeve valve 29 is rotatably carried upon the body 21 and rests upon an annular boss 40 that projects from the body 21. The position of the openings in the sleeve valve relative to the openings in the body 21 controls the arcuate degree of coverage of the sprinkler.

To hold the sleeve valve in place, an annular ring 41 is secured to the sleeve valve body 30 by the threaded engagement 42, the sleeve 41 engaging the opposite side of the projection 40. However, clearances are such that by grasping the knurled end 43 of the sleeve 41 the sleeve and the valve 29 can be rotated.

Figure 7:
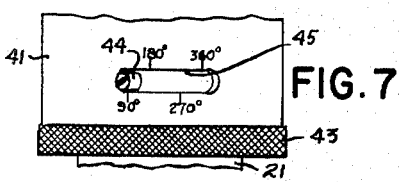
Figure 7 is a side elevational view of the lower portion of the device shown in Figure 2 which illustrates the indexing member for identifying the position of the control valve of the sprinkler.

A pin 44 extending through a slot 45 indicates the degree of coverage that can be made by the sprinkler when the pin lines up with any one of the indices on the exterior of the sleeve, as indicated in Figure 7.

The sleeve valve 29 is provided with an annular projection 46. A spinner body 47 is journaled on the sleeve valve 29 and has a recess 48 into which the projection 46 extends. An annular ring 49 is held within the spinner body 47 by the threaded connection 50, thus holding the spinner body on the sleeve valve 29.

The spinner body 47 is provided with a plurality of radiating arms 51 each of which has an outlet opening 52 for distributing the water.

To regulate the degree of arcuate coverage of the water distributed by the spinner, the sleeve valve 29 can be placed in the various positions illustrated in Figures 3, 4, 5 and 6, the valve being rotated in a counter-clockwise direction and the arcuate coverage being 90°, 180°, 270° and 360°, respectively.

Figure 3:
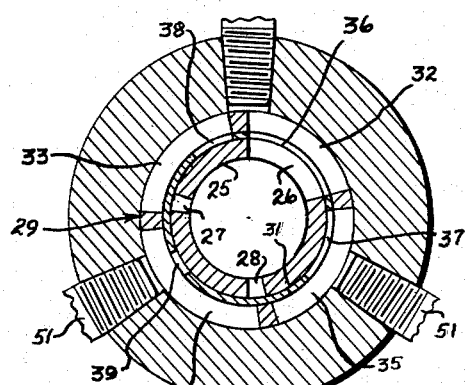
Figure 3 is a transverse cross-sectional view taken along line 3—3 of Figure 2 illustrating the control valve of the sprinkler in position to regulate the sprinkler-spread to 90°.

With the sleeve valve 29 in the position shown in Figure 3, water from the central chamber 25 will pass through the opening 26 into the slot 32 in the valve 29. Thus, as the spinner arms 51 pass across the slot 32, water will be distributed. The distribution will be controlled within an arc of approximately 90°.

Figure 4:
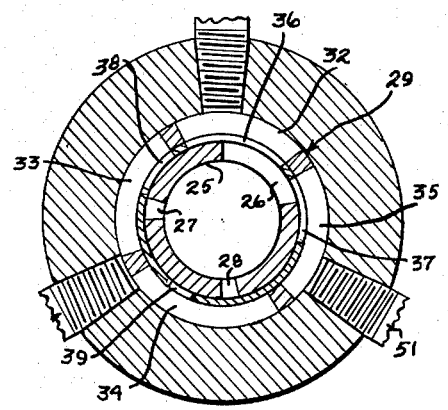
Figure 4 is a transverse cross-sectional view similar to Figure 3 but in which the sprinkler spread is controlled to 180°.

When the sleeve valve 29 is rotated counter-clockwise into the position shown in Fig. 4, water will pass from the chamber 25 through the opening 26 into the slots 32 and 35 in the sleeve valve 29. It will thus be seen that the control of distribution of the water upon rotation of the spinner will be through an arc of 180°.

Figure 5:
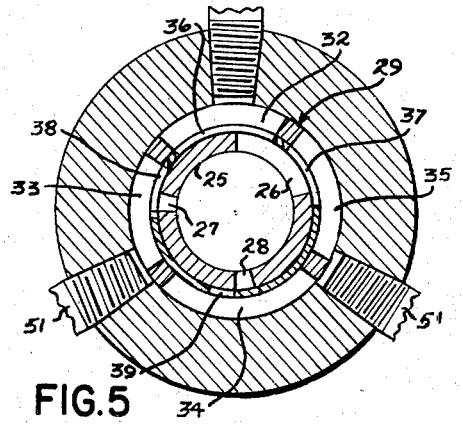
Figure 5 is a transverse cross-sectional view similar to Figure 3 but in which the sprinkler spread is controlled to 270°.

With the valve 29 rotated into the position illustrated in Figure 5, water will pass from the central chamber 25 through the opening 26 into the slots 32 and 35 as in Figure 4. But additionally, water will also pass from the central chamber 25 through the small opening 27 into the slot 33 in the valve 29. Thus, the water will be distributed by the spinner over an arc of 270°.

Figure 6:
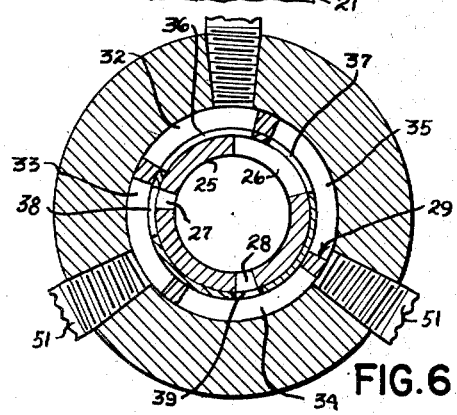
Figure 6 is a transverse cross-sectional view similar to Figure 3 in which the sprinkler spread is 360°.

With the valve 29 rotated into the position shown in Figure 6, water will pass from the central chamber 25 through the opening 26 into the slots 32 and 35 as before, and through the opening 27 into the slot 33 as in Figure 5. But additionally, water will pass through the opening 28 into the slot 34. By this arrangement of the valve relative to the body, water will distributed by the spinner throughout its entire rotation of 360°.

In Figures 8 to 13 there is illustrated a slightly modified arrangement of the sprinkler. In this modification the sprinkler consists of the body 100 that has a central chamber 101 in it. A water inlet conduit 102 delivers water into the chamber 101. Outlet openings for the water from the chamber 101 are provided in the form of a plurality of slots or ports 103 which are positioned radially in the body 100 and all at the same level.

The outlet ports 103 are provided in a reduced-diameter portion of the body 100, this reduced-diameter portion forming a bearing 104 and a shoulder 105 to receive a spinner body 106. The spinner body 106 is provided with a plurality of radiating arms 107, each of which has a water outlet port 108 that aligns with the ports 103 in the body 100.

The upper portion of the body 100 above the spinner body 106 is further reduced in diameter and receives a cap 109 which is held on the body 100 by the threaded connection 110. The cap 109 also holds the spinner body 106 in position on the body 100.

A sleeve valve 115 is provided to control the arcuate degree of distribution of the water by the spinner. This sleeve valve 115 is slidably received in the central chamber 101 of the body 100 and is provided with a central chamber 116.

The sleeve valve 115 is also provided with a pair of arcuate slots 117 and 118 which are 90° and 180° of arc respectively.

The sleeve valve 115 is provided with an actuator or stem 119 that has indicating marks 120 on it to indicate the position of the sleeve valve relative to the outlet ports 103 in the body 100. The top of the actuator may carry an indicating arrow 121 which points in the direction of distribution of the water-spray when using either of the slots 117 or 118 in the valve 115.

Figure 8:
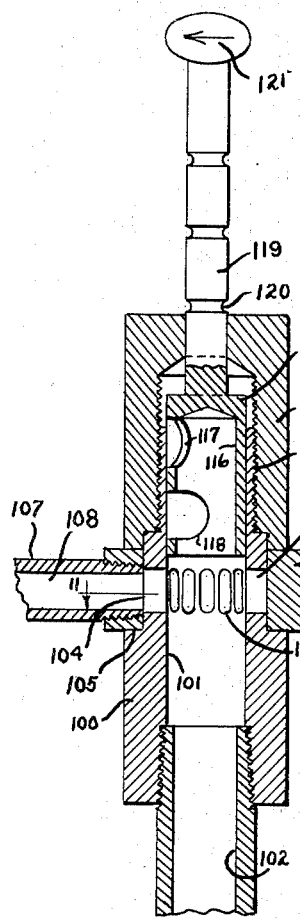
Figure 8 is a vertical cross-sectional view through a slightly modified design of the sprinkler and illustrates the control valve of the device in position for 360° spread of the sprinkler.

With the valve in the position shown in Figure 8 water will be distributed through all of the radial openings 103, thus giving 360° distribution of water by the spinner.

Figure 9:
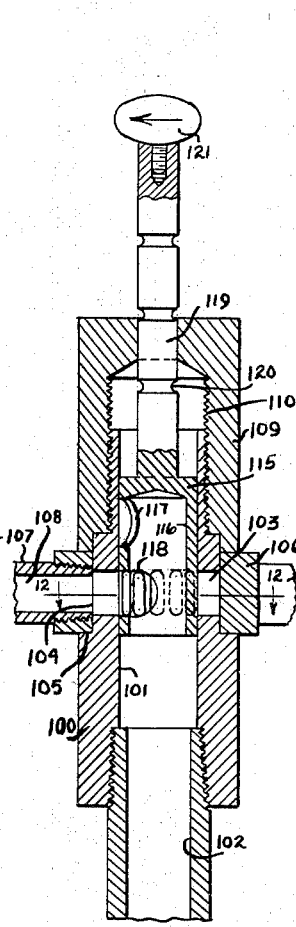
Figure 9 is a vertical cross-sectional view similar to Figure 8 with the control valve in position to control the spread of the spinkler to 180°.
Figure 12:
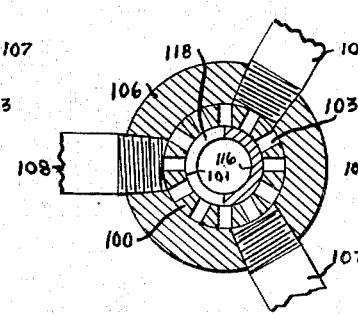
Figure 12 is a transverse cross-sectional view taken along line 12—12 of Figure 9.

When the valve 115 is in the position shown in Figure 9, the slot 118 aligns with the openings 103, and as shown in Figure 12, will block off approximately one-half the outlet ports 103. With the valve in this position the distribution of water will be controlled to 180° during rotation of the spinner.

Figure 10:
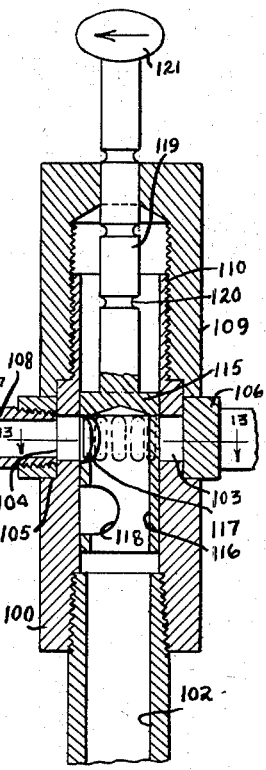
Figure 10 is a vertical cross-sectional view similar to Figure 8 but with the control valve in position to regulate the spread of the sprinkler to 90°.
Figure 11:
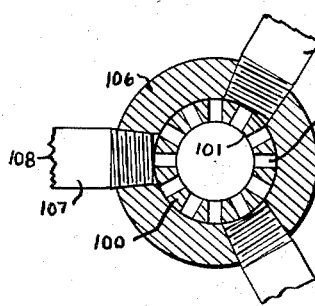
Figure 11 is a transverse cross-sectional view taken along line 11—11 of Figure 8.
Figure 13:
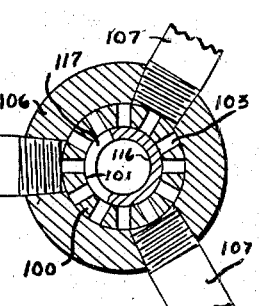
Figure 13 is a transverse cross-sectional view taken along line 13—13 of Figure 10.

When the valve 115 is in the position shown in Figure 10, the slot 117 is aligned with the ports 103, and as will be seen from Figure 13, the distribution of water by the spinner will be controlled to an arc of 90°.

While the apparatus disclosed and described herein constitute preferred forms of the invention, yet it will be understood that modifications can be made without departing from the spirit of the invention and that the modifications that fall within the scope of the appended claims are intended to be included herein.

Having thus fully described our invention, what we claim as new and desire to secure by Letters Patent is:

1. A sprinkler consisting of, a body having an axial chamber therein to receive water under pressure, said body having a water inlet opening for said chamber, a spinner mounted axially on said body for rotation thereon, said spinner having outlet passages for distributing water in a circular area inscribed about said body by the water discharging from the spinner, outlet passages in said body adapted to cooperate with said spinner outlet passages, a slide valve axially slidable in said body and rotatable therein relative to said body outlet passages and having waterflow passages therein selectively positionable relative to said body outlet passages upon reciprocal and rotative movement of the valve within said body to confine the water discharged by said spinner to selected segments of the circle inscribed by said spinner, and means engaging said slide valve to reciprocate the same in said body for selection of a segment over which water is discharged and to rotate said valve to select the radial position of the said discharge about said body.

2. A sprinkler consisting of, a body having an axial chamber therein to receive water under pressure, said body having a water inlet opening for said chamber, a spinner mounted axially on said body for rotation thereon, said spinner having outlet passages for distributing water in a circular area inscribed about said body by the water discharging from the spinner, outlet passages in said body adapted to cooperate with said spinner outlet passages, a slide valve axially slidable in said body and rotatable therein relative to said body outlet passages and having waterflow passages therein selectively positionable relative to said body outlet passages upon reciprocal and rotative movement of the valve within said body to confine the water discharged by said spinner to selected segments of the circle inscribed by said spinner, and an actuating member connected with said sleeve valve and projecting beyond said body to reciprocate the valve in said body for selection of a segment over which water is discharged and to rotate said valve to select the radial position of the said discharge about said body.

3. A sprinkler consisting of, a body having an axial chamber therein to receive water under pressure, said body having a water inlet opening for said chamber, a spinner mounted axially on said body for rotation thereon, said spinner having outlet passages for distributing water in a circular area inscribed about said body by the water discharging from the spinner, outlet passages in said body adapted to cooperate with said spinner outlet passages, a slide valve axially slidable in said body and rotatable therein relative to said body outlet passages and having waterflow passages therein selectively positionable relative to said body outlet passages upon reciprocal and rotative movement of the valve within said body to confine the water discharged by said spinner to selected segments of the circle inscribed by said spinner, and an actuating member connected with said sleeve valve and projecting beyond said body to reciprocate the valve in said body for selection of a segment over which water is discharged and to rotate said valve to select the radial position of the said discharge about said body, said actuating member having indicating marks thereon to establish the position of said valve relative to said body outlet passages.

4. A sprinkler consisting of, a body having a central chamber to receive water under pressure and a water inlet opening for said chamber, said body having a reduced diameter portion forming a shoulder thereon and for receiving a spinner, a spinner rotatable on said reduced diameter portion and supported by said shoulder, said spinner having outlet passages therein for distributing water in a circular area inscribed about said body by the water discharging from the spinner, water outlet passages in said body at the level of said reduced diameter portion thereof for communication with the outlet passages in said spinner, a cap member removably carried on said body and having a portion thereof disposed immediately above said spinner to prevent removal of said spinner from said reduced diameter portion, a sleeve valve slidably and rotatably movable in said central chamber relative to said body outlet passages and having a plurality of waterflow passages therein at different levels, each of said waterflow passages in said sleeve valve having a different arcuate length to confine the waterflow to said spinner outlet passages to selected segments of the circular area inscribed about said body by water discharging from said spinner, and means engaging said sleeve valve and extending to the exterior of said body to reciprocate said sleeve valve in said central chamber to selectively align one of said waterflow passages of said valve with said body outlet passages to select a circular area to be inscribed by water discharging from said spinner and for rotating said valve to select the radial position of the so inscribed area about said body.

5. A sprinkler consisting of, a body having a central chamber to receive water under pressure and a water inlet opening for said chamber, said body having a reduced diameter portion forming a shoulder thereon and for receiving a spinner, a spinner rotatable on said reduced diameter portion and supported by said shoulder, said spinner having outlet passages therein for distributing water in a circular area inscribed about said body by the water discharging from the spinner, water outlet passages in said body at the level of said reduced diameter portion thereof for communication with the outlet passages in said spinner, a cap member removably carried on said body and having a portion thereof disposed immediately above said spinner to prevent removal of said spinner from said reduced diameter portion, a sleeve valve slidably and rotatably movable in said central chamber relative to said body outlet passages and having a plurality of waterflow passages therein at different levels, each of said waterflow passages in said sleeve valve having a different arcuate length to confine the waterflow to said spinner outlet passages to selected segments of the circular area inscribed about said body by water discharging from said spinner, and an actuating member connected with said sleeve valve and projecting through said cap to reciprocate said sleeve valve in said central chamber to selectively align one of said waterflow passages of said valve with said body outlet passages to select a circular area to be inscribed by water discharging from said spinner and for rotating said valve to select the radial position of the so inscribed area about said body.

6. A sprinkler consisting of, a body having a central chamber to receive water under pressure and a water inlet opening for said chamber, said body having a reduced diameter portion forming a shoulder thereon and for receiving a spinner, a spinner rotatable on said reduced diameter portion and supported by said shoulder, said spinner having outlet passages therein for distributing water in a circular area inscribed about said body by the water discharging from the spinner, water outlet passages in said body at the level of said reduced diameter portion thereof for communication with the outlet passages in said spinner, a cap member removably carried on said body and having a portion thereof disposed immediately above said spinner to prevent removal of said spinner from said reduced diameter portion, a sleeve valve slidably and rotatably movable in said central chamber relative to said body outlet passages and having a plurality of waterflow passages therein at different levels, each of said waterflow passages in said sleeve valve having a different arcuate length to confine the waterflow to said spinner outlet passages to selected segments of the circular area inscribed about said body by water discharging from said spinner, an actuating member connected with said sleeve valve and projecting through said cap to reciprocate said sleeve valve in said central chamber to selectively align one of said waterflow passages of said valve with said body outlet passages to select a circular area to be inscribed by water discharging from said spinner and for rotating said valve to select the radial position of the so inscribed area about said body, and indicating means on said member providing for visual indication of the axial position of said waterflow passages in said valve relative to said body outlet passages and the radial segment to be inscribed by water discharging from said spinner.

7. A sprinkler consisting of, a body having a central chamber to receive water under pressure, said body having a water inlet opening for said chamber, a spinner around said body and having outlet passages therein for distributing water in a circular area inscribed about said body by the water discharging from the spinner, outlet passages in said body adapted to communicate with said spinner outlet passages, and a sleeve valve slidably rotatable on said body and having water flow passages therein in the same plane as the outlet passages in said body on rotation of said sleeve valve to confine the water flow to the spinner outlet passages to selected segments of the circular area inscribed selectively around said body.

8. A sprinkler consisting of, a body having a central chamber to receive water under pressure, said body having a water inlet opening for said chamber, a spinner around said body and having outlet passages therein for distributing water in a circular area inscribed about said body by the water discharging from the spinner, outlet passages in said body adapted to communicate with said spinner outlet passages, and a sleeve valve slidably movable on said body and having water flow passages therein movable relative to said body outlet passages in the same plane thereof upon movement of said sleeve valve to confine water flow to said spinner outlet passages to selected segments of the circular area so inscribed around said body, said sleeve valve being selectively reciprocable and rotatable on said body for movement of said passages in said sleeve valve relative to said outlet passages in said body to regulate the arcuate degree and radial position of water discharged by said spinner.

ROBINSON BROWN.
HUGH E. METCALF.

REFERENCES CITED

The following references are of record in the file of this patent:

FOREIGN PATENTS

| Number | Country | Date |
|---|---|---|
| 555,810 | France | Mar. 31, 1923 |
| 675,064 | France | Oct. 28, 1929 |